US010027185B2

(12) United States Patent
Moyer et al.

(10) Patent No.: US 10,027,185 B2
(45) Date of Patent: Jul. 17, 2018

(54) REDUCING THE IMPACT OF AN INDUCTIVE ENERGY TRANSFER SYSTEM ON A TOUCH SENSING DEVICE

(71) Applicant: Apple Inc., Cupertino, CA (US)

(72) Inventors: Todd K. Moyer, Cupertino, CA (US); Albert Lin, Cupertino, CA (US); Wesley W. Zuber, Cupertino, CA (US); Yehonatan Perez, Cupertino, CA (US); Jeffrey M. Alves, Cupertino, CA (US); Makiko K. Brzezinski, Cupertino, CA (US); Eric S. Jol, Cupertino, CA (US); Paul J. Thompson, Cupertino, CA (US); Priyank D. Patel, Cupertino, CA (US); Christian M. Sauer, Cupertino, CA (US); Christopher S. Graham, Cupertino, CA (US); Jim C. Hwang, Cupertino, CA (US); Micah Lewis-Kraus, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 740 days.

(21) Appl. No.: 14/502,042

(22) Filed: Sep. 30, 2014

(65) Prior Publication Data
US 2015/0349539 A1   Dec. 3, 2015

Related U.S. Application Data

(60) Provisional application No. 62/005,822, filed on May 30, 2014, provisional application No. 62/044,991, filed on Sep. 2, 2014.

(51) Int. Cl.
*H02J 50/70* (2016.01)
*H04B 15/02* (2006.01)
(Continued)

(52) U.S. Cl.
CPC .............. *H02J 50/70* (2016.02); *H02J 5/005* (2013.01); *H02J 7/025* (2013.01); *H02J 50/12* (2016.02); *H02J 50/90* (2016.02); *H04B 15/02* (2013.01)

(58) Field of Classification Search
CPC . H02J 5/005; H02J 50/12; H02J 50/70; H04B 15/02
See application file for complete search history.

(56) References Cited

U.S. PATENT DOCUMENTS

| 6,989,728 B2 | 1/2006 | Van Zeeland et al. |
| 7,504,905 B1 | 3/2009 | Steinbrecher |

(Continued)

FOREIGN PATENT DOCUMENTS

| CN | 101681719 | 3/2010 |
| CN | 102044915 | 5/2011 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Jared Fureman
*Assistant Examiner* — Rafael Pacheco
(74) *Attorney, Agent, or Firm* — Brownstein Hyatt Farber Schreck, LLP

(57) ABSTRACT

A transmitter device for an inductive energy transfer system can include a DC-to-AC converter operably connected to a transmitter coil, a first capacitor connected between the transmitter coil and one output terminal of the DC-to-AC converter, and a second capacitor connected between the transmitter coil and another output terminal of the DC-to-AC converter. One or more capacitive shields can be positioned between the transmitter coil and an interface surface (Continued)

of the transmitter device. A receiver device can include a touch sensing device, an AC-to-DC converter operably connected to a receiver coil, a first capacitor connected between the receiver coil and one output terminal of the AC-to-DC converter, and a second capacitor connected between the receiver coil and another output terminal of the AC-to-DC converter. One or more capacitive shields can be positioned between the receiver coil and an interface surface of the receiver device.

20 Claims, 11 Drawing Sheets

(51) Int. Cl.
    *H02J 7/02*     (2016.01)
    *H02J 50/90*     (2016.01)
    *H02J 5/00*     (2016.01)
    *H02J 50/12*     (2016.01)

(56) References Cited

U.S. PATENT DOCUMENTS

| | | |
|---|---|---|
| 7,812,268 B2 | 10/2010 | Ely et al. |
| 7,948,208 B2 | 5/2011 | Partovi et al. |
| 7,952,322 B2 | 5/2011 | Partovi et al. |
| 8,169,185 B2 | 5/2012 | Partovi et al. |
| 8,547,350 B2 | 10/2013 | Anglin et al. |
| 8,629,652 B2 | 1/2014 | Partovi et al. |
| 8,629,654 B2 | 1/2014 | Partovi et al. |
| 8,890,470 B2 | 11/2014 | Partovi |
| 8,896,264 B2 | 11/2014 | Partovi |
| 8,901,881 B2 | 12/2014 | Partovi |
| 8,917,362 B2 | 12/2014 | Wang et al. |
| 8,947,047 B2 | 2/2015 | Partovi et al. |
| 9,030,289 B2 | 5/2015 | Lai |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,178,369 B2 | 11/2015 | Partovi |
| 9,276,437 B2 | 3/2016 | Partovi et al. |
| 9,356,659 B2 | 5/2016 | Partovi |
| 2007/0272919 A1 | 11/2007 | Mori et al. |
| 2011/0050164 A1 | 3/2011 | Partovi et al. |
| 2011/0221385 A1 | 9/2011 | Partovi et al. |
| 2011/0273402 A1* | 11/2011 | Hotelling ............... G06F 3/0416 345/174 |
| 2012/0038577 A1 | 2/2012 | Brown et al. |
| 2012/0086669 A1 | 4/2012 | Kim et al. |
| 2012/0235636 A1* | 9/2012 | Partovi ................... H02J 7/025 320/108 |
| 2012/0313863 A1 | 12/2012 | Hsu |
| 2013/0093388 A1 | 4/2013 | Partovi |
| 2013/0099563 A1 | 4/2013 | Partovi et al. |
| 2013/0099585 A1* | 4/2013 | Von Novak ............. H01F 38/14 307/104 |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2014/0085247 A1 | 3/2014 | Leung et al. |
| 2014/0103873 A1 | 4/2014 | Partovi et al. |
| 2014/0132210 A1 | 5/2014 | Partovi |
| 2014/0145734 A1* | 5/2014 | Lin .......................... G01D 5/24 324/684 |
| 2014/0191568 A1 | 7/2014 | Partovi |
| 2014/0306654 A1 | 10/2014 | Partovi |
| 2015/0130412 A1 | 5/2015 | Partovi |

FOREIGN PATENT DOCUMENTS

| | | |
|---|---|---|
| CN | 102801218 | 11/2012 |
| CN | 102959830 | 3/2013 |
| CN | 103493334 | 1/2014 |
| CN | 103827997 | 5/2014 |
| CN | 204967433 | 1/2016 |
| EP | 2528185 | 11/2012 |
| JP | 2008236968 | 10/2008 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

* cited by examiner

*FIG. 1 – Prior Art*

REDUCING THE IMPACT OF AN INDUCTIVE ENERGY TRANSFER SYSTEM ON A TOUCH SENSING DEVICE

CROSS REFERENCE TO RELATED APPLICATIONS

This application claims the benefit under 35 U.S.C. § 119(e) of U.S. Provisional Patent Application No. 62/005,822, filed May 30, 2014, entitled "Reducing the Impact of an Inductive Energy Transfer System on a Touch Sensing Device," and U.S. Provisional Patent Application No. 62/044,991, filed Sep. 2, 2014, entitled "Reducing the Impact of an Inductive Energy Transfer System on a Touch Sensing Device," the entireties of which are incorporated herein by reference as if fully disclosed herein.

TECHNICAL FIELD

The present invention relates generally to inductive energy transfer systems in electronic devices, and more particularly to techniques for reducing the impact of an inductive energy transfer system on a touch sensing device in an electronic device.

BACKGROUND

Many electronic devices include one or more rechargeable batteries that require external power to recharge from time to time. Often, these devices may be charged using a similar power cord or connector, for example a universal serial bus ("USB") connector. However, despite having common connection types, devices often require separate power supplies with different power outputs. These multiple power supplies can be burdensome to use, store, and transport from place to place. As a result, the benefits of device portability may be substantially limited.

Furthermore, charging cords may be unsafe to use in certain circumstances. For example, a driver of a vehicle may become distracted attempting to plug an electronic device into a vehicle charger. In another example, a charging cord may present a tripping hazard if left unattended.

To account for these and other shortcomings of portable electronic devices, some devices include an inductive energy transfer device. The user may simply place the electronic device on an inductive charging surface of a charging device in order to transfer energy from the charging device to the electronic device. The charging device transfers energy to the electronic device through inductively coupling between a transmitter coil in the charging device and a receiver coil in the electronic device. In some situations, an inductive energy transfer device can adversely impact the operations of a touch sensing device in an electronic device that includes both a touch sensing device and an inductive energy transfer device.

FIG. 1 illustrates a simplified block diagram of a prior art transmitter device and a receiver device in an inductive energy transfer system. The charging device 102 ("transmitter device") includes a transmitter coil 104 that couples inductively with a receiver coil 106 in the electronic device 108 ("receiver device") to transfer energy from the transmitter device to the receiver device. At certain frequencies, noise produced by the transmitter device 102 can adversely impact a touch sensing device 110 in the receiver device 108 when a user touches an input surface for the touch sensing device 110 while the transmitter device is transferring energy to the receiver device (e.g., to charge the battery 112). The noise can overwhelm the measurements obtained by the touch sensing device and make it difficult to discern a touch measurement from the noise. The noise can reduce or effectively destroy the resolution of the touch sensing device.

For example, in some embodiments the touch sensing device is a capacitive touch sensing device that detects touch through changes in capacitance measurements. When the user touches the input surface of the touch device (e.g., with a finger 114), a parasitic capacitance exists between the finger and an earth ground 116. A parasitic capacitance (represented by capacitor 122) also exists between the AC-to-DC converter 118 and the earth ground 116. Common mode noise produced by the DC-to-AC converter 120 in the transmitter device 102 can couple to the receiver device through the parasitic capacitance $C_P$. The common mode noise produces a noise signal $I_N$ that produces a varying voltage across the capacitor 122. The touch by the finger 114 is input with respect to the earth ground 116, but the touch sensing device 110 measures capacitance $C_{SIG}$ with respect to a device ground. Effectively, the varying voltage across the capacitor 122 interferes with the capacitive touch measurement and makes it difficult to discern the touch measurement from the noise.

SUMMARY

In one aspect, an inductive energy transfer system can include a transmitter device and a receiver device. The transmitter device can include a transmitter coil positioned adjacent to a first interface surface of the transmitter device and one or more capacitive shields positioned between the transmitter coil and the receiver device. The receiver device may include a receiver coil positioned adjacent to a second interface surface of the receiver device and one or more capacitive shields positioned between the receiver coil and the transmitter device. The second interface surface of the receiver device may be configured to mate with the first interface surface of the transmitter device.

In some embodiments, the capacitive shield is disposed on at least one surface of the interface surface. The capacitive shield can be made of any suitable material. As one example, the capacitive shield may be a conductive paint, such as a carbon paint. In other embodiments, the capacitive shield is configured as a separate component that is positioned adjacent to the interface surface. The separate component may be made of, for example, a paramagnetic material, a grounded pressure sensitive adhesive (PSA), or a grounded flexible printed circuit (FPC).

In another aspect, the transmitter device can include a DC-to-AC converter operably connected to the transmitter coil, a first capacitor connected in series between the transmitter coil and one output terminal of the DC-to-AC converter, and a second capacitor connected in series between the transmitter coil and another output terminal of the DC-to-AC converter. In one embodiment, the DC-to-AC converter is configured as a full bridge circuit and the first and second capacitors are substantially matched. A processing device can control the opening and closing of the switches in the DC-to-AC converter.

In another aspect, the receiver device can include an AC-to-DC converter operably connected to the receiver coil, a third capacitor connected in series between the receiver coil and one output terminal of the AC-to-DC converter, and a fourth capacitor connected in series between the receiver coil and another output terminal of the AC-to-DC converter. The receiver device can also include a touch sensing device.

Matching the capacitor values of the capacitors in the transmitter device, matching the capacitor values of the capacitors in the receiver device, using a full bridge circuit as a DC-to-AC converter in the transmitter device, including one or more capacitive shields in the transmitter device, and/or including one or more capacitive shields in the receiver device can reduce or cancel the amount of noise transferred from the transmitter device to the receiver device during energy transfer. Decreasing the amount of noise transferred to the receiver device reduces the impact that inductive energy transfer has on a touch sensing operation performed by the touch sensing device when the transmitter device is transferring energy inductively to the receiver device.

Differentially balanced signals can be produced when the capacitors in the transmitter device and in the receiver device are matched capacitors, and when a full bridge circuit is used as a DC-to-AC converter in the transmitter device. The differential balanced signals reduce or cancel common mode noise produced by the transmitter device, which decreases the impact inductive energy transfer has on the touch sensing device.

In another aspect, the receiver device can include a processing device that is adapted to select a stimulation frequency for the touch sensing device based on the amount of noise the touch sensing device receives when the receiver coil is receiving energy inductively.

And in yet another embodiment, a touch sensing device can select an optimum or desired stimulation frequency from two or more predetermined stimulation frequencies based on the amount of noise created by the inductive energy transfer system during energy transfer. A first sample can be taken by the touch sensing device at a first stimulation frequency, and a second sample can be taken by the touch sensing device at a second stimulation frequency. The first and second samples can be compared along with the noise received from the inductive energy transfer system. Based on the comparison, the optimum or desired stimulation frequency can be selected for the touch sensing device.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein can reduce the effect an inductive energy transfer has on a touch sensing device in an electronic device. In one embodiment, the signals in the transmitter device and in the receiver device are differentially balanced signals. The differentially balanced signals may reduce or cancel the common mode noise produced by the transmitter device, which in turn can decrease the impact inductive energy transfer has on the touch sensing device.

In some embodiments, one or more capacitive shields may be included in the transmitter device and/or in the receiver device to further reduce or cancel the noise transferred from the transmitter device to the receiver device during inductive energy transfer, which in turn can further decrease the impact inductive energy transfer has on the touch sensing device.

A capacitive shield may be positioned between an inductor coil and an interface surface of the electronic device (e.g., between the transmitter coil and the transmitter interface surface). In some embodiments, the capacitive shield is disposed on at least one surface of the interface surface. The capacitive shield can be made of any suitable material. As one example, the capacitive shield may be a conductive paint, such as a carbon paint. In other embodiments, the capacitive shield is configured as a separate component that is positioned adjacent to the interface surface. The separate component may be made of, for example, a paramagnetic material, a grounded pressure sensitive adhesive (PSA), or a grounded flexible printed circuit (FPC).

In other embodiments, a first capacitive shield is formed on at least one surface of the interface surface, and a second capacitive shield is a separate component that is positioned between the inductor coil and the interface surface. The first and second capacitive shields can be made of any suitable material. As one example, the first capacitive shield may be a conductive paint (e.g., carbon paint) and the second capacitive shield made a paramagnetic material, a grounded PSA, or a grounded FPC.

Figure 1:
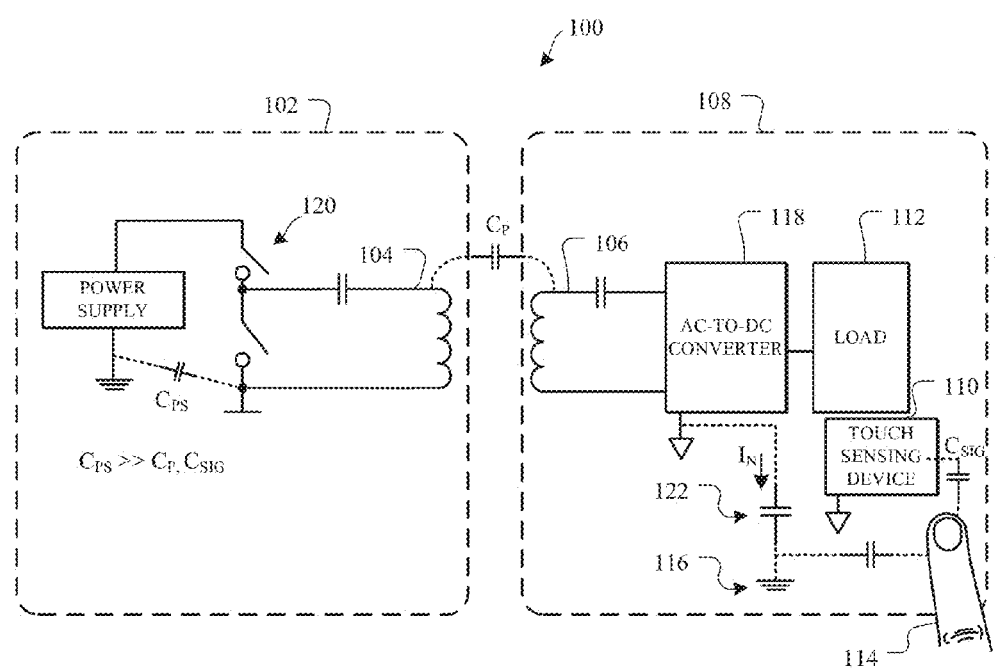
FIG. 1 illustrates a simplified block diagram of a prior art transmitter device and a receiver device in an inductive energy transfer system.
Figure 2:
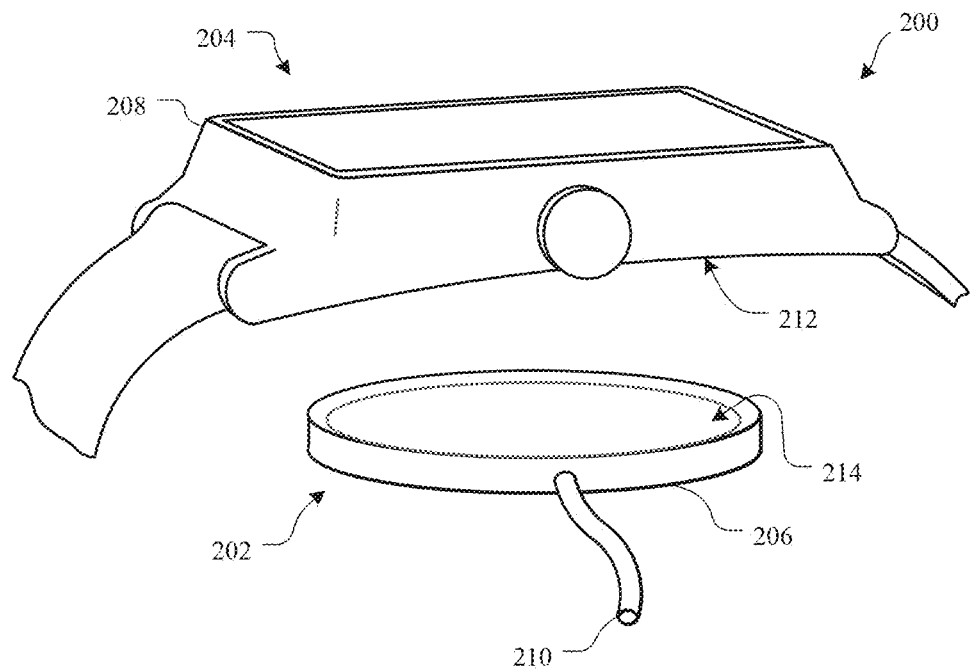
FIGS. 2 and 3 are perspective views of one example of an inductive energy transfer system.

Referring now to FIG. 2, there is shown a perspective view of one example of an inductive energy transfer system in an unmated configuration. The illustrated embodiment shows a transmitter device 202 that is configured to wirelessly pass energy to a receiver device 204. The receiver device 204 can be any electronic device that includes one or more inductors, such as a portable electronic device or wearable communication device.

The wearable communication device, such as depicted in FIG. 2, may be configured to provide, for example, wireless electronic communication from other devices, and/or health-related information or data such as but not limited heart rate data, blood pressure data, temperature data, oxygen level data, diet/nutrition information, medical reminders, health-related tips or information, or other health-related data. A wearable communication device may include a strap or band to connect to secure the wearable communication device to a user. For example, a smart watch may include a band or strap to secure to a user's wrist. In another example, a wearable communication device may include a strap to connect around a user's chest, or alternately, a wearable communication device may be adapted for use with a lanyard or necklace. In still further examples, a wearable communication device may secure to or within another part of a user's body. In these and other embodiments, the strap, band, lanyard, or other securing mechanism may include one or more electronic components or sensors in wireless or wired communication with the communication device. For example, the band secured to a smart watch may include one or more sensors, an auxiliary battery, a camera, or any other suitable electronic component.

In many examples, a wearable communication device, such as the wearable communication device depicted in FIG. 2, may include a processor coupled with or in communication with a memory, one or more communication interfaces, output devices such as displays and speakers, one or more sensors, such as biometric and imaging sensors, and input devices such as one or more buttons, one or more dials, a microphone, and/or a touch sensing device. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable communication device may provide information regarding time, health, statuses or externally connected or communicating devices and/or software executing on such devices, messages, video, operating commands, and so forth (and may receive any of the foregoing from an external device), in addition to communications.

Figure 3:
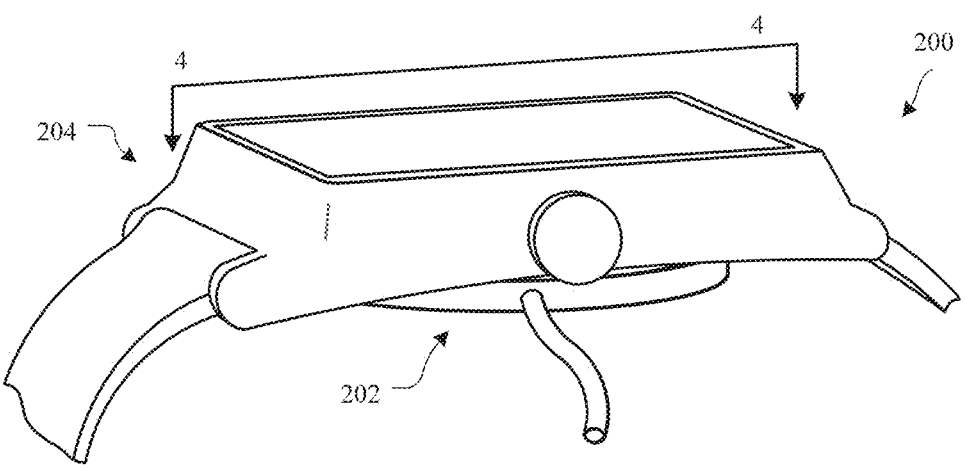

Although the system 200 illustrated in FIGS. 2 and 3 depicts a wristwatch or smart watch, any electronic device may be suitable to receive energy inductively from a transmitter device. For example, a suitable electronic device may be any portable or semi-portable electronic device that may receive energy inductively ("receiver device"), and a suitable dock device may be any portable or semi-portable docking station or charging device that may transmit energy inductively ("transmitter device").

The transmitter device 202 and the receiver device 204 may each respectively include a housing 206, 208 to enclose electronic, mechanical and structural components therein. In many examples, and as depicted, the receiver device 204 may have a larger lateral cross section than that of the transmitter device 202, although such a configuration is not required. In other examples, the transmitter device 202 may have a larger lateral cross section than that of the receiver device 204. In still further examples, the cross sections may be substantially the same. And in other embodiments, the transmitter device can be adapted to be inserted into a charging port in the receiver device.

In the illustrated embodiment, the transmitter device 202 may be connected to a power source by cord or connector 210. For example, the transmitter device 202 can receive power from a wall outlet, or from another electronic device through a connector, such as a USB connector. Additionally or alternatively, the transmitter device 202 may be battery operated. Similarly, although the illustrated embodiment is shown with the connector 210 coupled to the housing of the transmitter device 202, the connector 210 may be connected by any suitable means. For example, the connector 210 may be removable and may include a connector that is sized to fit within an aperture or receptacle opened within the housing 106 of the transmitter device 202.

The receiver device 204 may include a first interface surface 212 that may interface with, align or otherwise contact a second interface surface 214 of the transmitter device 202. In this manner, the receiver device 204 and the transmitter device 202 may be positionable with respect to each other. In certain embodiments, the second interface surface 214 of the transmitter device 202 may be configured in a particular shape that mates with a complementary shape of the receiver device 204 (see FIG. 3). The illustrative second interface surface 214 may include a concave shape that follows a selected curve. The first interface surface 212 of the receiver device 204 may include a convex shape following the same or substantially similar curve as the second interface surface 214.

In other embodiments, the first and second interface surfaces 212, 214 can have any given shape and dimensions. For example, the first and second interface surfaces 212, 214 may be substantially flat. Additionally or alternatively, the transmitter and receiver devices 202, 204 can be positioned with respect to each other using one or more alignment mechanisms. As one example, one or more magnetic devices may be included in the transmitter and/or receiver devices and used to align the transmitter and receiver devices. In another example, one or more actuators in the transmitter and/or receiver devices can be used to align the transmitter and receiver devices. And in yet another example, alignment features, such as protrusions and corresponding indentations in the interface surfaces and/or housings of the transmitter and receiver devices, may be used to align the transmitter and receiver devices. The design or configuration of the interface surfaces, one or more alignment mechanisms, and one or more alignment features can be used individually or in various combinations thereof.

Figure 4:
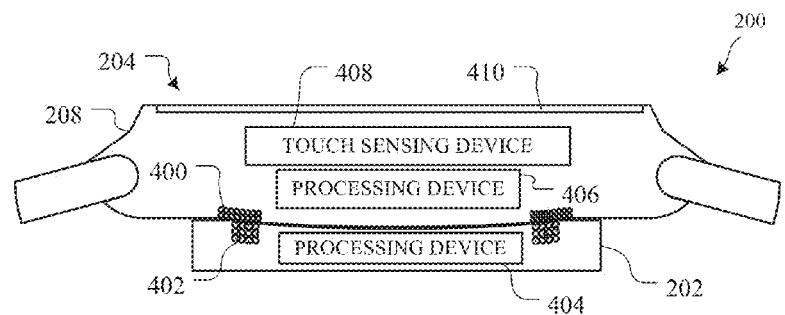
FIG. 4 depicts a simplified cross-sectional view of the inductive energy transfer system taken along line 4-4 in FIG. 3.

FIG. 4 illustrates a side cross-sectional view of the inductive energy transfer system taken along line 4-4 in FIG. 3. As discussed earlier, both the transmitter device 202 and the receiver device 204 can include electronic, mechanical, and/or structural components. For example, the receiver device 204 can include one or more processing devices, memory, a communication interface for wired and/or wireless communication, and a display, one or more input/output devices such as buttons, a microphone, and/or speaker(s). The illustrated embodiment of FIG. 4 omits the electronic, mechanical, and/or structural components for simplicity.

FIG. 4 shows the example inductive energy transfer system in a mated and aligned configuration. The receiver device 204 includes one or more receiver coils having one or more windings. The receiver coil 400 may receive energy from the transmitter device 202 and may use the received energy to communicate with, perform, or coordinate one or more functions of the receiver device 204, and/or to replenish the charge of a battery (not shown) within the receiver device 204. In the illustrated embodiment, the receiver coil 400 includes sixteen windings arranged in two layers or rows. The receiver coil 400 can have a different number of windings arranged in one or more layers in other embodiments.

Similarly, the transmitter device 202 includes one or more transmitter coils having one or more windings. The transmitter coil 402 may transmit energy to the receiver device 204. In the illustrated embodiment, the transmitter coil 402 includes twelve windings arranged in three layers. In other embodiments, the transmitter coil 402 can have a different number of windings arranged in one or more layers.

The transmitter device 202 can also include a processing device 404. The processing device 404 can control one or more operations in the transmitter device 204. For example, the processing device 404 can control the switching frequency of the DC-to-AC converter (not shown) and/or the amount of power applied to the transmitter coil 402.

The transmitter and receiver coils can be implemented with any suitable type of inductor. Each coil can have any desired shape and dimensions. The transmitter and receiver coils can have the same number of windings or a different number of windings. Typically, the transmitter and receiver coils are surrounded by an enclosure to direct the magnetic flux in a desired direction (e.g., toward the other coil). The enclosures are omitted in FIG. 4 for simplicity.

The receiver device 204 also includes a processing device 406 and a touch sensing device 408. The processing device 406 can control one or more operations in the receiver device 204. In one embodiment, the touch sensing device 408 may be operatively connected to a display 410 to detect a touch and/or force applied to the surface of the display. Additionally or alternatively, the touch sensing device 408 can be operatively connected to another input device such as a button and/or to a portion of the housing of the receiver device.

The processing devices 404, 406 can each be implemented as any electronic device capable of processing, receiving, or transmitting data or instructions. For example, a processing device can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

Figure 5:
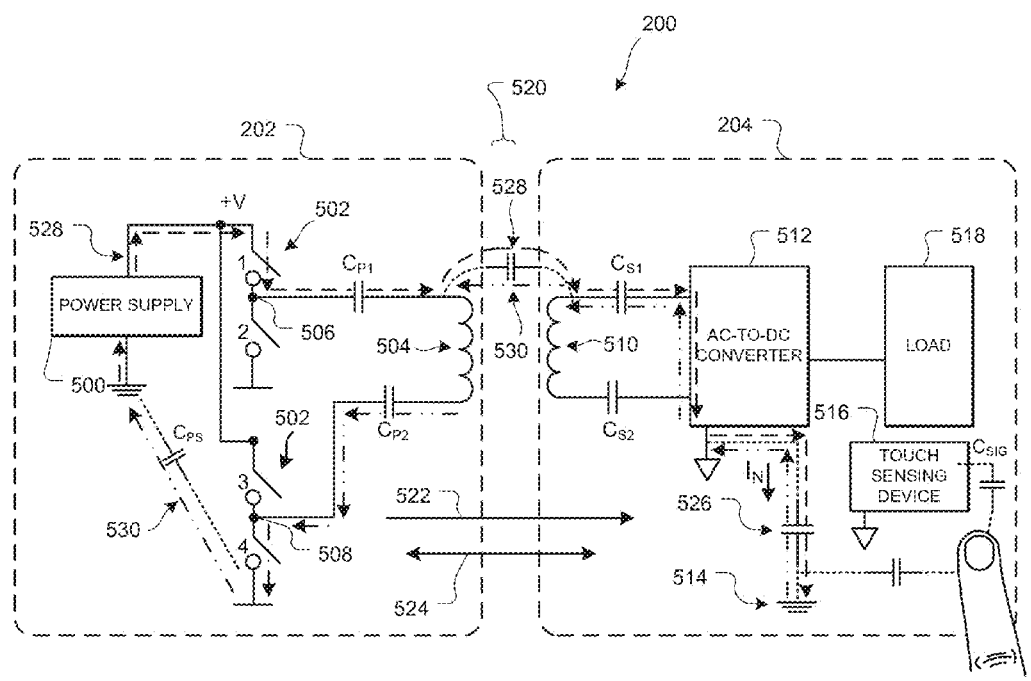
FIG. 5 illustrates a simplified block diagram of one example of the inductive energy transfer system 200 shown in FIGS. 2-4.

Referring now to FIG. 5, there is shown a simplified block diagram of one example of the inductive energy transfer system 200 shown in FIGS. 2-4. The transmitter device 202 includes a power supply 500 operably connected to a DC-to-AC converter 502. Any suitable type of a DC-to-AC converter may be used. For example, the DC-to-AC converter is constructed as a bridge circuit in the illustrated embodiment. The DC-to-AC converter 502 is operatively connected to a transmitter coil 504. A first capacitor $C_{P1}$ is connected in series between one output terminal 506 of the bridge circuit 502 and the transmitter coil 504, and a second capacitor $C_{P2}$ is connected in series between the other output terminal 508 of the bridge circuit 502 and the transmitter coil 504.

The receiver device 204 can include a receiver coil 510 operably connected to an AC-to-DC converter 512. Any suitable type of AC-to-DC converter may be used. For example, the AC-to-DC converter can be constructed as a diode bridge in one embodiment. A parasitic capacitance exists between the AC-to-DC converter 512 and earth ground 514, and between the finger touching the touch sensing device 516 and the earth ground 514 (represented by capacitor 526). The capacitor $C_{SIG}$ represents the capacitance to be measured between the finger and the touch sensing device 516.

A third capacitor $C_{S1}$ is connected in series between one output terminal (not shown) of the AC-to-DC converter 512 and the receiver coil 510, and a second capacitor $C_{S2}$ is connected in series between the other output terminal (not shown) of the AC-to-DC converter and the receiver coil. A load 518 is operably connected to the output of the AC-to-DC converter 512. The load 518 is a rechargeable battery in one embodiment. A different type of load can be included in other embodiments.

The transmitter coil 504 and the receiver coil 510 together form a transformer 520. The transformer 520 transfers power or energy through inductive coupling between the transmitter coil 504 and the receiver coil 510 (energy transfer represented by arrow 522). Essentially, energy is transferred from the transmitter coil 504 to the receiver coil 510 through the creation of a varying magnetic flux by the AC signal in the transmitter coil 504 that induces a current in the receiver coil 510. The AC signal induced in the receiver coil 510 is received by the AC-to-DC converter 512 that converts the AC signal into a DC signal. In embodiments where the load 518 is a rechargeable battery, the DC signal is used to charge the battery. Additionally or alternatively, the transferred energy can be used to transmit communication signals to or from the receiver device (communication signals represented by arrow 524).

The frequency or rate at which the switches in the DC-to-AC converter 502 are opened and closed produces a given frequency of the AC signal applied to the transmitter coil. Opening and closing the switches oppositionally in the DC-to-AC converter 502 can cause the transmitter coil 504 to operate differentially in that the common mode noise is reduced or cancelled as measured across the transmitter coil 504 to earth ground. In other words, the voltage measured at the center of the transmitter coil should be zero or near zero. The switches are enabled and disabled oppositionally when switches 1 and 4 are closed and switches 2 and 3 are opened followed by switches 1 and 4 being opened and switches 2 and 3 closed. A processing device, such as processing device 404 in FIG. 4, can be adapted to control the opening and closing of the switches.

Additionally, the first and second capacitors $C_{P1}$ and $C_{P2}$ in the transmitter device 202 balance the transmitter device, and the third and fourth capacitors $C_{S1}$ and $C_{S2}$ in the receiver device 204 balance the receiver device. The first and second capacitors $C_{P1}$ and $C_{P2}$ can be matched capacitors. Similarly, the third and fourth capacitors $C_{S1}$ and $C_{S2}$ may be matched capacitors. With matched capacitors, the signals in the transmitter device and in the receiver device are differentially matched signals. The differential balanced signals reduce or cancel the common mode noise, which decreases the impact inductive energy transfer has on the touch sensing device 516. As one example, the noise can be reduced to hundreds of millivolts compared to some prior art noise levels of five to ten volts.

The common mode noise can be defined as the voltage difference between the device chassis or ground and earth ground. The device chassis or ground references the capacitive touch sensing device 516, while earth ground references the finger touching the touch sensing device 516 (and accordingly the capacitance $C_{SIG}$ to be measured). In the differential embodiment shown in FIG. 5, the two sides of the full bridge 502 create opposing voltages between the device ground and the earth ground. The opposing voltages are depicted in FIG. 5 by the direction of displacement current flow (see arrow paths 528, 530).

Figure 6:
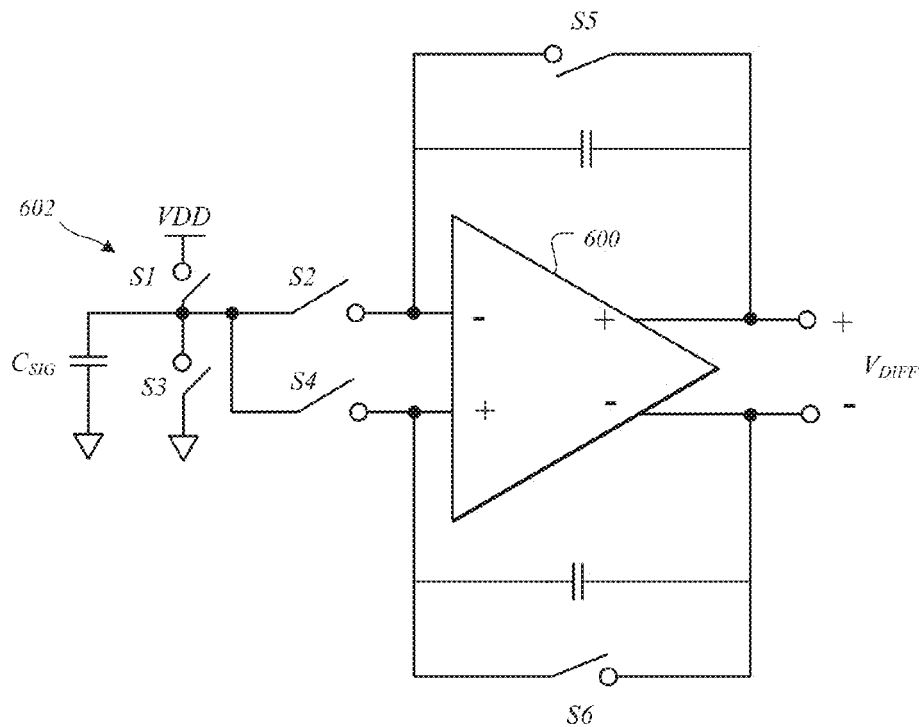
FIG. 6 is a simplified schematic of an example differential integrator suitable for use in a touch sensing device.

In some embodiments, the stimulation frequency of the touch sensing device may be selected when the common mode noise is reduced in the inductive energy transfer system. The stimulation frequency $F_{STIM}$ is the frequency or rate at which the touch sensing device is charged and discharged. FIG. 6 is a simplified schematic of an example differential integrator suitable for use in a touch sensing device. The inputs to the differential integrator 600 are operably connected to a switching device 602. The switching device includes four switches S1, S2, S3, and S4. A capacitor $C_{SIG}$ is operably connected to the switching device. $C_{SIG}$ represents the capacitance or signal that is measured by the touch sensing device.

The switches S5 and S6 are closed when the differential integrator 600 is to be reset. The differential integrator 600 may be reset between each measurement in some embodiments. In other embodiments, multiple measurements are taken before the differential integrator 600 is reset. The measurements are added together when multiple measurements are taken before the differential integrator 600 is reset.

Only one of the four switches in the switching device 602 is closed when $C_{SIG}$ is sampled. The four switches can close sequentially in the order of the switch number. Thus, switch S1 closes and $C_{SIG}$ is sampled a first time (all other switches are open). Next, switches S1, S3, S4 are open, switch S2 is closed, and $C_{SIG}$ is sampled a second time. The switches S1, S2, S4 are then open, switch S3 is closed, and $C_{SIG}$ is sampled a third time. Next, the switches S1, S2, S3 are open, the switch S4 is closed, and $C_{SIG}$ is sampled a fourth time.

Figure 7:
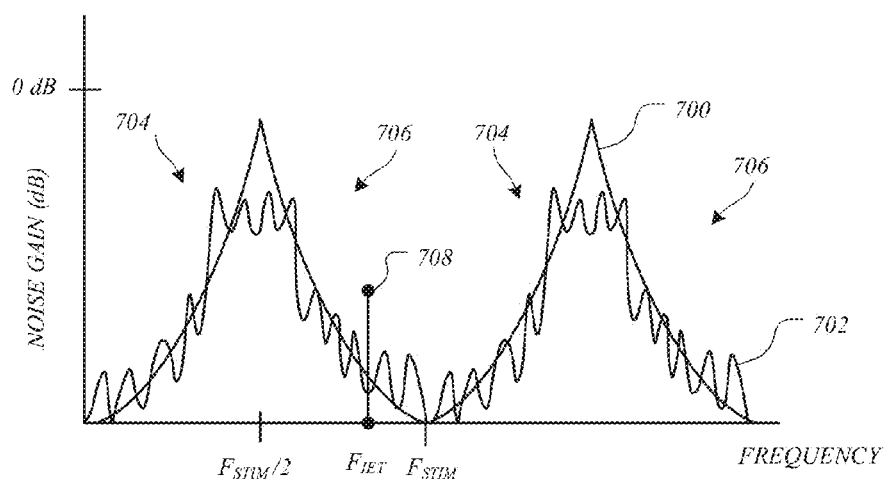
FIG. 7 depicts a plot of the noise gain versus the stimulation frequency of the differential integrator 600 shown in FIG. 6.

In one embodiment, the differential integrator is charged and discharged twice for each sample of $C_{SIG}$. FIG. 7 depicts a plot of the noise gain versus the stimulation frequency of the differential integrator 600 shown in FIG. 6. The plot 700 is produced when the differential integrator 600 is reset after a single sample of $C_{SIG}$ (i.e., a single integration period). The plot 702 is generated when multiple integration cycles occur before the differential integrator is reset. Regions 704 in the plots 700, 702 represent charging of the differential integrator and regions 706 discharging of the differential integrator. Thus, a peak in the noise gain may occur at or near $F_{STIM}/2$.

Plot 708 represents the voltage signal produced by the noise across the parasitic capacitance (represented by capacitor 526) in FIG. 5. The frequency at which the plot 708 occurs is the switching frequency of the DC-to-AC converter 502 in the transmitter device 202 (see FIG. 5). Based on a known switching frequency, the stimulation frequency $F_{STIM}$ can be selected to minimize the impact the inductive energy transfer has on the touch sensing device. Based on the switching frequency for the DC-to-AC converter 502, the stimulation frequency $F_{STIM}$ can be selected such that the samples of the touch sensing devices create nulls in the response. The magnitude of the noise gain of the touch sensing device should be sufficiently low so that the transfer of inductive energy does not significantly reduce the resolution of the touch sensing device. In the illustrated embodiment, the frequency of the inductive energy transfer is at the frequency $F_{IET}$, a frequency that can occur between $F_{STIM}/2$ and $F_{STIM}$. In some embodiments, a range of frequencies can exist that provides sufficient attenuation to produce a desirable level of accuracy in the touch measurements.

Figure 8:
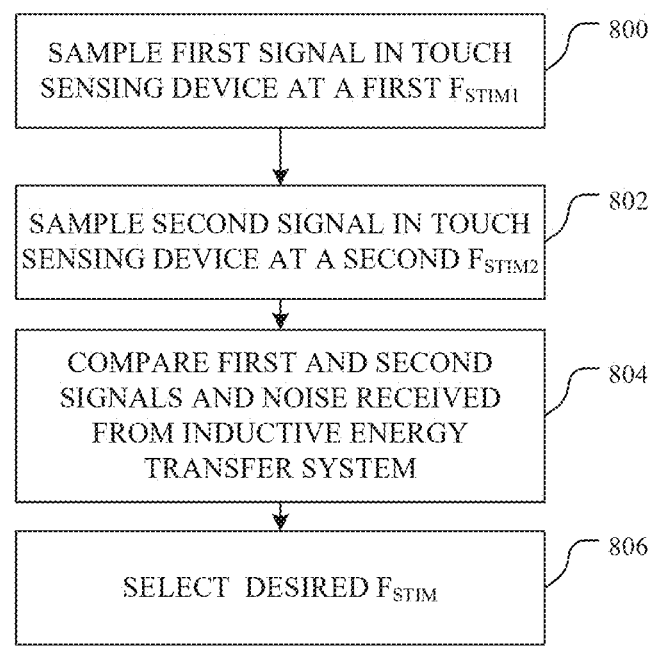
FIG. 8 is a flowchart of a method for selecting a stimulation frequency in a touch sensing device.

Referring now to FIG. 8, there is shown a flowchart of a method for selecting a stimulation frequency in a touch sensing device. In some embodiments, the bandwidth of a null in the response of the touch sensing device can be sufficiently large to allow two or more stimulation frequencies for the touch sensing device. The touch sensing device can select the best stimulation frequency based on the amount of noise created by the inductive energy transfer system. The illustrated method is described in conjunction with two stimulation frequencies. Other embodiments can use more than two stimulation frequencies.

Initially, first sample can be taken by the touch sensing device at a first $F_{STIM1}$ (block 800). A second sample can be taken by the touch sensing device at a second $F_{STIM2}$ (block 802). The second $F_{STIM2}$ is a different frequency than the first $F_{STIM1}$. Next, as shown in block 804, the first and second samples can be compared along with the noise received from the inductive energy transfer system. Based on the comparison, the optimum or desired stimulation frequency can be selected for the touch sensing device (block 806). A processing device, such as processing device 406 in FIG. 4, may be adapted to perform the method of FIG. 8. The method can be performed at the beginning of the energy transfer process. Additionally or alternatively, the method may be performed periodically or at select times while a receiver device is receiving energy inductively (i.e., during the energy transfer process).

Figure 9:
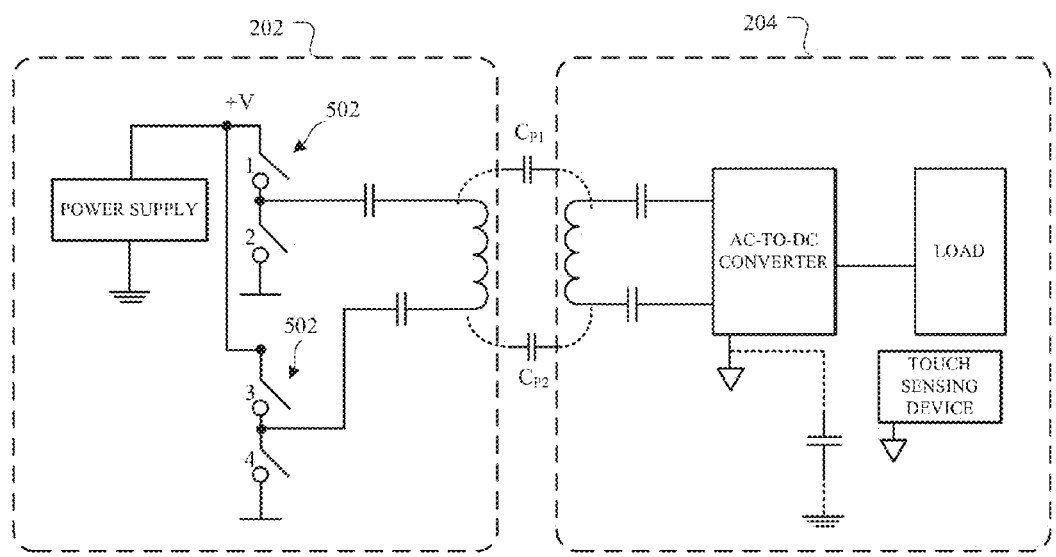
FIG. 9 illustrates a simplified schematic diagram of the example of the inductive energy transfer system 200 shown in FIG. 5.

Referring again to FIG. 5, in some situations the parasitic capacitance between the transmitter coil and the receiver coil can be modeled as two capacitors $C_{P1}$ and $C_{P2}$ (see FIG. 9), with one of the capacitors having a larger value than the other capacitor (e.g., $C_{P1} > C_{P2}$). In these situations, noise produced in the transmitter device 202 can couple to the receiver device 204 through the parasitic capacitance $C_{P1}$ and $C_{P2}$. To reduce the amount of noise that is transferred to the receiver device through the parasitic capacitances, one or more capacitive shields can be included in the transmitter device and/or in the receiver device.

Figure 10A:
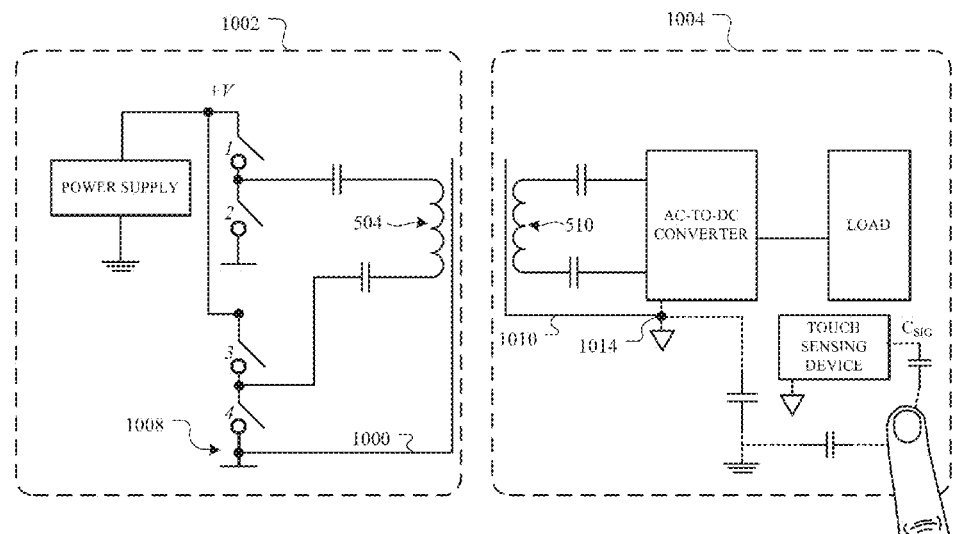
FIG. 10A depicts a simplified schematic diagram of an inductive energy transfer system that includes capacitive shields.

FIG. 10A depicts a simplified schematic diagram of an inductive energy transfer system that includes capacitive shields. A first capacitive shield 1000 in a transmitter device 1002 may be positioned between the transmitter coil 504 and the receiver device 1004. The first capacitive shield 1000 is electrically connected to ground 1008. A second capacitive shield 1010 in the receiver device 1004 can be positioned between the receiver coil 510 and the transmitter device 1002. The second capacitive shield 1010 is electrically connected to ground 1014.

The first capacitive shield and the second capacitive shield are configured to reduce or block electric fields passing between the transmitter device and the receiver device. The first and second capacitive shields do not reduce or block the varying magnetic fields passing from the transmitter coil 504 to the receiver coil 510. As described earlier, any suitable material or materials can be used to form a capacitive shield. As one example, a capacitive shield may be made of a carbon-based material. As other examples, a capacitive shield can be made of aluminum or a paramagnetic material.

Figure 10B:
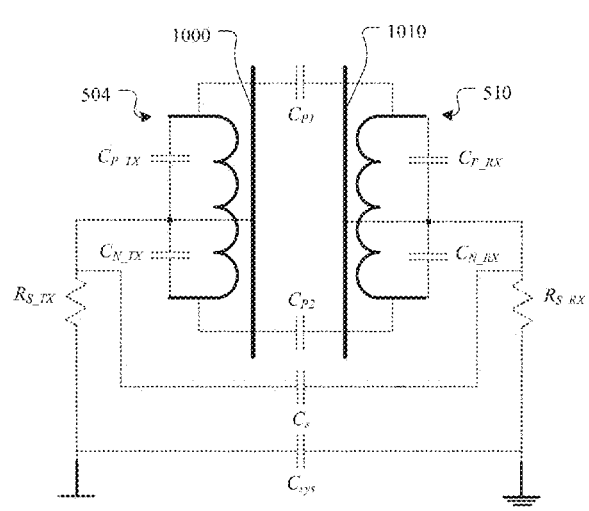
FIG. 10B is a detail view of the parasitic capacitances in FIG. 10A.

The capacitive shields 1000, 1010 can create parasitic capacitances that can be controlled to increase the effectiveness of the shields. FIG. 10B is a detailed view of the parasitic capacitances in FIG. 10A. Both the first capacitive shield 1000 and the second capacitive shield 1010 have a sheet resistance (Rs_tx and Rs_rx, respectively). In some embodiments, the sheet resistances Rs_tx and Rs_rx can be governed by the equation Rs_rx and Rs_tx<<1/(2π*f*max{Cp_rx, Cn_rx, Cp_tx, Cn_tx, Cs), where f is frequency, Cs is the capacitance between the two capacitive shields, Cp_tx is the capacitance coupling from the positive terminal of the transmitter coil 504 to the first capacitive shield 1000, Cn_tx is the capacitance coupling from the negative terminal of the transmitter coil 504 to the first capacitive shield 1000, $Cp\_rx$ is the capacitance coupling from the positive terminal of the receiver coil 510 to the second capacitive shield 1010, $Cn\_rx$ is the capacitance coupling from the negative terminal of the receiver coil 510 to the second capacitive shield 1010, $Rx\_tx$ is the total sheet resistance of the first capacitive shield 1000 to ground, and $Rx\_rx$ is the total sheet resistance of the second capacitive shield 1010 to ground. In some embodiments, coil-to-coil coupling ($Cp_1$, $Cp_2$) should be smaller than the capacitance of the device to earth ground. For example, the coil-to-coil coupling can be 100× smaller than the capacitance of the device to earth ground. Other embodiments can use other difference magnitudes for the coil-to-coil coupling ($Cp_1$, $Cp_2$).

Figure 11:
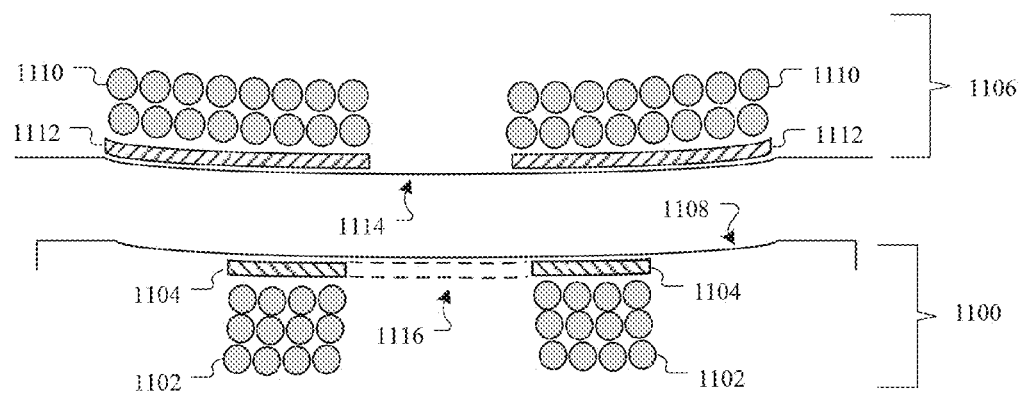
FIG. 11 illustrates a simplified cross-section view of a first inductive energy transfer system that includes capacitive shields.

Referring now to FIG. 11, there is shown a simplified cross-sectional view of an inductive energy transfer system that includes capacitive shields. A transmitter device 1100 includes a transmitter coil 1102 and a capacitive shield 1104 positioned between the transmitter coil 1102 and the receiver device 1106. In one example embodiment, the capacitive shield 1104 can be a component included in the transmitter device 1100. In another example embodiment, the capacitive shield 1104 can be a material that is disposed on or formed over at least one surface (interior and/or exterior surface) of the interface surface 1108 of the transmitter device 1100.

The receiver device 1106 includes a receiver coil 1110 and a capacitive shield 1112 positioned between the receiver coil 1110 and the transmitter device 1100. Similar to the first capacitive shield 1104, the second capacitive shield 1112 can be a component included in the receiver device 1106. In another example embodiment, the capacitive shield 1112 can be a material that is disposed on or formed over at least one surface of the interface surface 1114 of the receive device 1106.

A capacitive shield may be a conductive paint, such as a carbon paint, that is formed on or over at least one surface (exterior and/or interior) of the interface surface. In other embodiments, the capacitive shield is configured as a separate component that is positioned adjacent to the interface surface. The separate component may be made of, for example, a paramagnetic material, a grounded PSA, or a grounded FPC.

Those skilled in the art will recognize that a capacitive shield can have any given shape and dimensions. For example, in some embodiments, the capacitive shield can extend across the interface surface of a transmitter and/or a receiver device. In the illustrated embodiment, the dashed lines in the region 1116 of the transmitter device 1100 depict the option of extending the first capacitive shield across the interface surface 1108.

Figure 12:
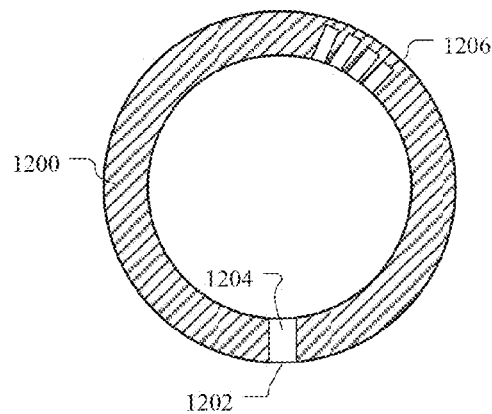
FIGS. 12-14 are plan views of an inductor coil and a capacitive shield suitable for use in a transmitter device or in a receiver device.

FIG. 12 is a plan view of an inductor coil and a first capacitive shield suitable for use in a transmitter device or in a receiver device. A capacitive shield 1200 is shown positioned over an inductor coil 1202. In the illustrated embodiment, the capacitive shield 1200 has a shape and size that substantially matches the shape and size of the inductor coil 1202.

In some embodiments, the capacitive shield 1200 may be configured as a separate component that is adjacent to an interface surface (e.g., surface 212 or 214 in FIG. 2) of the transmitter device or receiver device. As one example, a capacitive shield can be formed as a distinct capacitive shield that corresponds to the shape of the inductor coil. The capacitive shield can be positioned between the inductor coil and an interior surface of the interface surface. Additionally or alternatively, the capacitive shield may be positioned over an exterior surface of the interface surface such that the interface surface is between the inductor coil and the capacitive shield.

The changing magnetic field used to transfer energy inductively can induce electric currents in the capacitive shield 1200. These electric currents are known as eddy currents. Eddy currents flowing through the capacitive shield dissipates some of the energy as heat, which results in energy losses. To reduce these energy losses, the capacitive shield 1200 can include one or more gaps or breaks 1204 in the capacitive shield. The gap(s) prevent the eddy currents from flowing around the capacitive shield. Additionally or alternatively, in some embodiments, the capacitive shield 1200 may include one or more cutouts 1206 formed along at least one edge of the capacitive shield. The cutouts can reduce losses caused by eddy currents.

The gap(s) and/or the cutout(s) can have any given shape and dimensions. Additionally, the gaps(s) and/or cutout(s) can be positioned at any suitable location in the capacitive shield.

Figure 13:
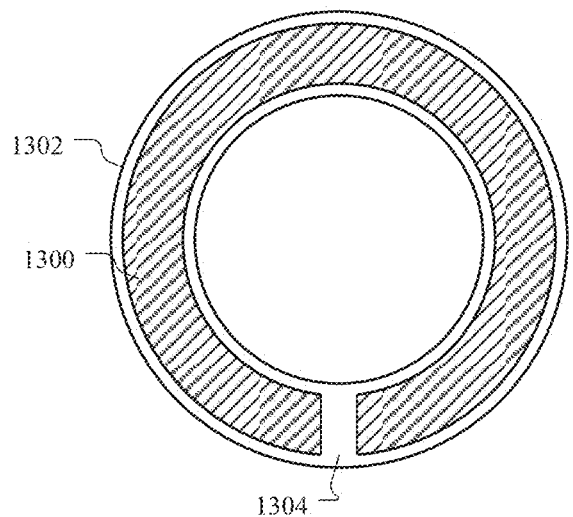

Referring now to FIG. 13, there is shown a plan view of an inductor coil and a second capacitive shield suitable for use in a transmitter device or in a receiver device. The capacitive shield 1300 is shown positioned over the inductor coil 1302. The capacitive shield 1300 includes one or more gaps 1304 to reduce losses caused by eddy currents. Although not shown in FIG. 13, the capacitive shield 1300 may include one or more cutouts in addition to, or as an alternative to, the gap(s) 1304.

Similar to the embodiment shown in FIG. 12, the capacitive shield 1300 is configured as a distinct component that is positioned adjacent to an interior and/or exterior surface of the interface surface of the transmitter device or receiver device. In the illustrated embodiment, the capacitive shield 1300 is formed in a shape that corresponds to the shape of the inductor coil 1302, but is smaller in size compared to the inductor coil. Although shown centered with respect to the inductor coil, the capacitive shield 1300 may have any suitable alignment with respect to the inductor coil.

Figure 14:
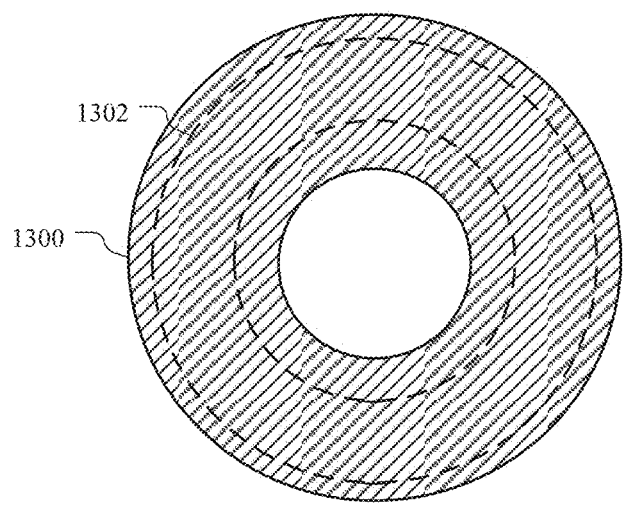

In another embodiment, the capacitive shield 1300 can be formed in a shape corresponding to the shape of the inductor coil 1302 and be larger in size compared to the inductor coil (see FIG. 14). Moreover, as described earlier, the shape of the capacitive shield can have any given design and dimensions. As one example, the capacitive shield can be a rectangle shape positioned adjacent to a round inductor coil.

Figure 15:
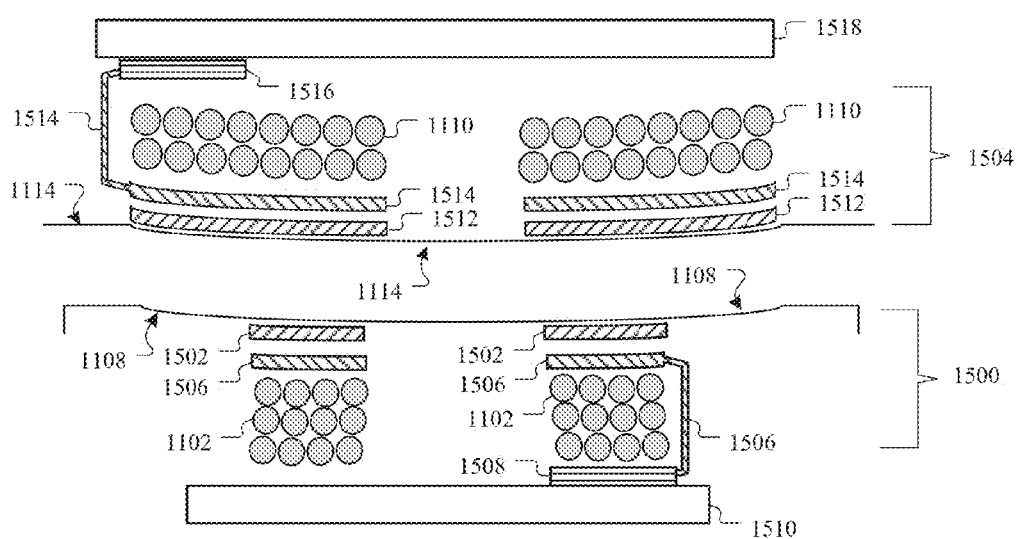
FIG. 15 depicts a simplified cross-section view of a second inductive energy transfer system that includes capacitive shields.

Referring now to FIG. 15, there is shown a simplified cross-section view of a second inductive energy transfer system that includes capacitive shields. A transmitter device 1500 includes a transmitter coil 1102 and a first capacitive shield 1502 positioned between the transmitter coil 1102 and the receiver device 1504. In one example embodiment, the first capacitive shield 1502 can be a material that is disposed on or formed over at least one surface (interior and/or exterior surface) of the interface surface 1108 of the transmitter device 1500. For example, the first capacitive shield may be a conductive paint, such as a carbon paint.

The transmitter device 1500 can include a second capacitive shield 1506 that is positioned between the first capacitive shield 1502 and the transmitter coil 1102. The second capacitive shield can be made of any suitable material. As one example, the second capacitive shield may be a grounded PSA, such as an aluminized mylar, a carbon scrim, a copper foil PSA, pattern silver ink traces, or a graphite PSA. As another example, the second capacitive shield can be a grounded FPC, such as a patterned copper FPC, an indium tin oxide FPC, or a patterned carbon/silver FPC. The second capacitive shield 1506 can be electrically connected to a ground on a circuit element 1508. The circuit element may be, for example, another FPC or a printed circuit board. The circuit element 1508 can be attached to a support structure 1510.

The receiver device 1504 includes a receiver coil 1110 and a first capacitive shield 1512 positioned between the receiver coil 1110 and the transmitter device 1500. Similar to the capacitive shield 1502 in the transmitter device 1500, this first capacitive shield 1512 can be a material that is disposed on or formed over at least one surface (interior and/or exterior surface) of the interface surface 1114 of the receiver device 1504. For example, the first capacitive shield 1512 may be a conductive paint, such as a carbon paint.

The receiver device 1504 can include a second capacitive shield 1514 that is positioned between the first capacitive shield 1512 and the receiver coil 1110. The second capacitive shield can be made of any suitable material. Like the second capacitive shield 1506 in the transmitter device, the second capacitive shield 1514 may be a grounded PSA or a grounded FPC. The second capacitive shield 1514 can be electrically connected to a ground on a circuit element 1516. The circuit element may be, for example, another FPC or a printed circuit board. The circuit element 1516 can be attached to a support structure 1518.

Although not shown in FIGS. 11 and 15, those skilled in the art will recognize that additional layers or elements can be included in the transmitter device and/or the receiver device. As one example, the transmitter coil and/or receiver coil may be surrounded by an enclosure to direct the magnetic flux in a desired direction (e.g., toward the other coil). Additionally or alternatively, electrical components may be positioned between the interface surface and the second capacitive shield in the transmitter device and/or the receiver device. For example, one or more openings may be formed through the interface surface in the receiver device to permit biometric sensors, such as a PPG sensor, to sense or capture biometric data. Additionally or alternatively, additional electrical components may be connected to the circuit element 1508 and/or 1516.

Figure 16:
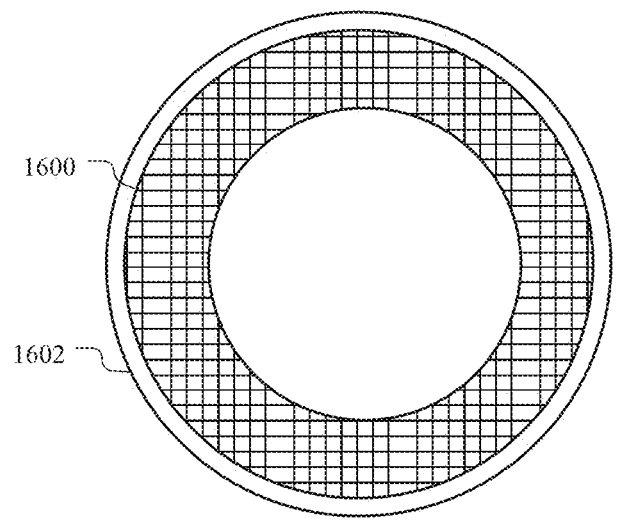
FIGS. 16-17 are plan views of a capacitive shield formed on a surface of an interface surface that is suitable for use in a transmitter device or in a receiver device.
Figure 17:
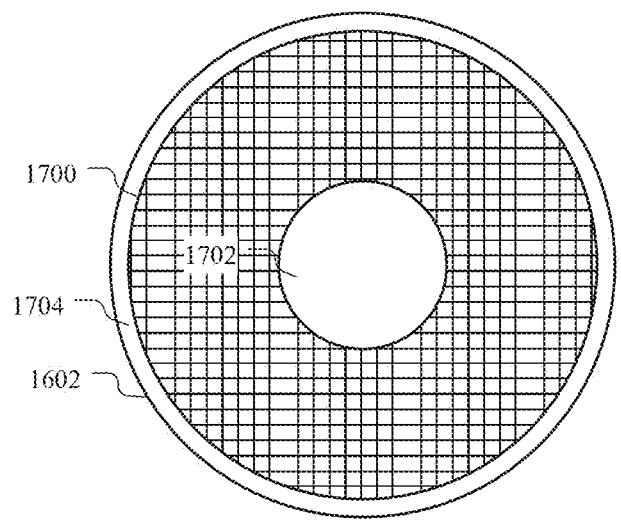

FIGS. 16-17 are plan views of a capacitive shield formed on a surface of an interface surface that is suitable for use in a transmitter device or in a receiver device. The material of the capacitive shield 1600 may be disposed over an interior surface of the interface surface 1602, such that the capacitive shield 1600 is between the inductor coil and the interface surface. Additionally or alternatively, the capacitive shield 1600 may be formed over the exterior surface of the interface surface 1602. As one example, a conductive paint, such as a carbon paint, may be formed over the interior surface and/or the exterior surface of the interface surface of the transmitter device and/or the receiver device.

The illustrated capacitive shield 1600 has a shape and size that corresponds to an inductor coil. Other embodiments, however, can configure the capacitive shield in any given shape or size. For example, the capacitive shield 1700 shown in FIG. 17 may have a shape that corresponds to an inductor coil, but the capacitive shield can be larger in size than the inductive coil. Optionally, an area 1702 of the surface 1704 of the interface surface 1602 may not be covered by the capacitive shield 1700, or the capacitive shield can cover the entire area of the surface 1704.

Although not shown in FIGS. 16 and 17, the capacitive shield may include one or more gaps and/or cutouts to reduce eddy currents. The gap(s) and/or the cutout(s) can have any given shape and dimensions. Additionally, the gaps(s) and/or cutout(s) can be positioned at any suitable location in the capacitive shield.

As described herein, a transmitter device and/or a receiver device can each include one or more capacitive shields. A capacitive shield can be a separate component that is positioned between the inductor coil and the interface surface of the device. Additionally or alternatively, a capacitive shield may be formed on at least one surface of the interface surface. The capacitive shield can be formed on an interior surface of the interface surface, an exterior surface, or both the interior and exterior surfaces. The capacitive shield or shields can have any given shape, design, and size.

In some embodiments, mechanical constraints may not allow for full coil coverage on the receiver coil and/or the transmitter coil due to limited space. In such a situation, a larger shield on one device (e.g., transmitter device) and a smaller shield on the other device (e.g., receiver device) can be employed. The geometry of the smaller shield may be chosen to minimize the fringe field coupling. In other embodiments, the capacitive shields can be made to overhang the coils on both transmitter and receiver devices if space allows and this will decrease fringe field coupling and reduce noise further.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible. For example, embodiments can include all of the components described herein. Alternatively, embodiments can include some of the components. As one non-limiting example, a transmitter device can open and close the switches oppositionally in the DC-to-AC converter and include a capacitive shield, but not include the matched capacitor values for capacitors $C_{P1}$ and $C_{P2}$. Additionally, the components included in the transmitter device can be different from the components included in the receiver device. As one non-limiting example, a transmitter device can open and close the switches in the DC-to-AC converter oppositionally, matched capacitor values for capacitors $C_{P1}$ and $C_{P2}$, and the capacitive shield. A receiver device can include the capacitive shield but not include matched capacitor values for capacitors $C_{S1}$ and $C_{S2}$.

What is claimed is:

1. A receiver device for an inductive energy transfer system, the receiver device comprising:
 a touch sensing device;
 a receiver coil;
 a first capacitor connected in series between the receiver coil and one input terminal of an AC-to-DC converter;
 a second capacitor connected in series between the receiver coil and another input terminal of the AC-to-DC converter, wherein the first and second capacitors are matched to reduce an amount of noise the touch sensing device receives when the receiver coil is receiving energy inductively.

2. The receiver device as in claim 1, further comprising a first capacitive shield positioned adjacent to the receiver coil, wherein the capacitive shield reduces an amount of noise transferred to the receiver coil inductively to reduce an amount of noise received by the touch sensing device.

3. The receiver device as in claim 2, wherein the first capacitive shield comprises a distinct capacitive shield that is positioned between the receiver coil and an interface surface of the receiver device.

4. The receiver device as in claim 3, wherein the first capacitive shield is made of one of a paramagnetic material, a grounded pressure sensitive adhesive, and a grounded flexible printed circuit.

5. The receiver device as in claim 2, wherein the first capacitive shield is formed on a surface of an interface surface of the receiver device.

6. The receiver device as in claim 5, wherein the first capacitive shield comprises a conductive paint.

7. The receiver device as in claim 1, wherein the touch sensing device comprises a capacitive touch sensing device.

8. The receiver device as in claim 1, wherein the touch sensing device includes a differential integrator.

9. The receiver device as in claim 8, wherein the receiver device further comprises a processing device adapted to select a stimulation frequency for the touch sensing device based on the amount of noise transferred to the receiver device.

10. A portable electronic device comprising:
a capacitive sensor; and
an inductive power receiver comprising:
  a receive coil comprising:
    a first output terminal; and
    a second output terminal;
  a load comprising:
    a first input terminal; and
    a second input terminal;
  a first resonant capacitor having a first capacitance and coupling the first output terminal of the receive coil to the first input terminal of the load; and
  a second resonant capacitor having the first capacitance and coupling the second output terminal of the receive coil to the second input terminal of the load.

11. The electronic device of claim 10, further comprising:
a housing enclosing:
  the capacitive sensor; and
  the inductive power receiver; wherein
the electronic device further comprises a shield positioned between the housing and the receive coil.

12. The electronic device of claim 11, wherein the capacitive sensor comprises a touch-sensitive or force-sensitive sensitive interface.

13. The electronic device of claim 11, wherein the shield is disposed on an interior surface of the housing.

14. The electronic device of claim 11, wherein the load comprises a rechargeable battery.

15. An inductive power receiver comprising:
a receive coil comprising:
  a first output terminal; and
  a second output terminal;
a load comprising:
  a first input terminal; and
  a second input terminal; and
a set of matched resonant capacitors coupling the first output terminal of the receive coil to the first input terminal of the load and the second output terminal of the receive coil to the second input terminal of the load; wherein
the set of matched resonant capacitors reduces common mode noise in the inductive power receiver when the receive coil is receiving energy.

16. The inductive power receiver of claim 15, wherein the load comprises a capacitive touch input sensor separated from the receive coil.

17. The inductive power receiver of claim 16, further comprising an electrically conductive shield positioned over the receive coil and configured to reduced common mode noise in the inductive power receiver when the receive coil is receiving energy.

18. The inductive power receiver of claim 17, wherein the electrically conductive shield comprises one or more cutouts.

19. The inductive power receiver of claim 15, wherein:
the receive coil is surrounded in an enclosure configured to direct flux into the receive coil.

20. The inductive power receiver of claim 15, wherein the set of matched resonant capacitors comprises:
a first resonant capacitor coupling the first output terminal of the receive coil to the first input terminal of the load; and
a second resonant capacitor coupling the second output terminal of the receive coil to the second input terminal of the load.

* * * * *